April 28, 1936.   P. H. HORWITT   2,039,168
RAZOR BLADE WIPER
Filed Feb. 14, 1935
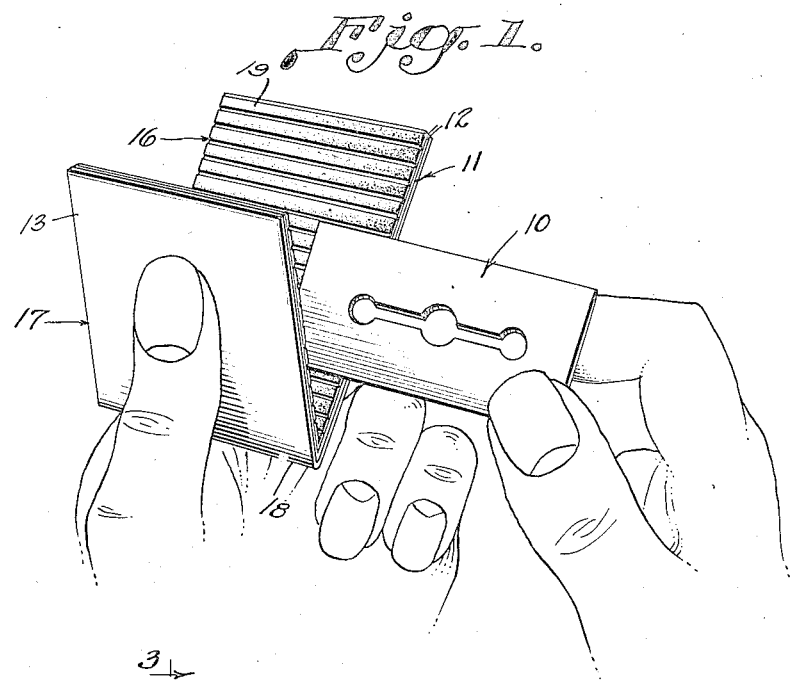
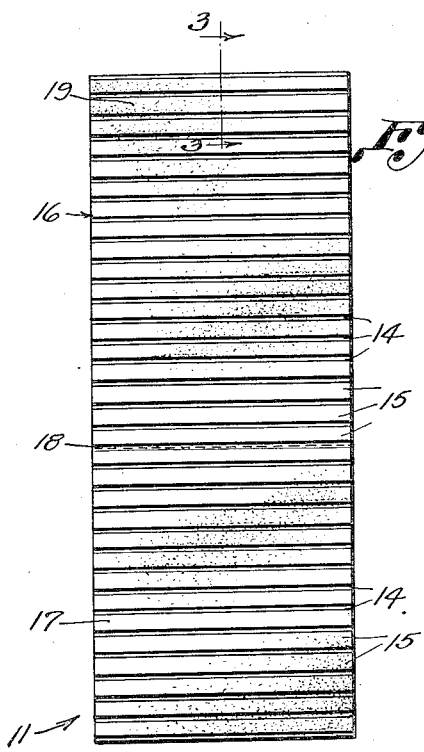
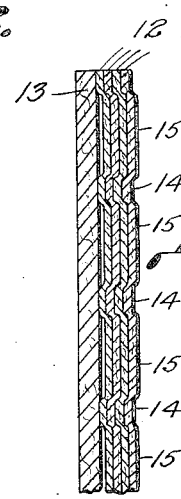
Inventor
Paul H. Horwitt
By Miller & Miller
Attorneys Patented Apr. 28, 1936

2,039,168

UNITED STATES PATENT OFFICE 2,039,168

RAZOR BLADE WIPER

Paul H. Horwitt, Hartsdale, N. Y.

Application February 14, 1935, Serial No. 6,569

1 Claim. (Cl. 15—218)

This invention relates to a razor blade wiper and cleaner and has for an object to provide an improved razor blade wiper which is suitable for razor blades of all types, safety razor blades, as well as straight razor blades.

Patent No. 1,967,937, issued July 24th, 1934, to the undersigned, shows a razor blade preserving wiper made up of a pair of wiping sheets having their ends secured by means of staples to the folded over edges of a backing sheet.

The present invention relates to a razor blade wiper which is intended for the same use as that in the aforementioned patent, but in the present invention, the wiper sheets are secured to the backing sheets in a much more economical fashion than that in the aforementioned patent, so as to produce a less expensive article.

The present invention also relates to a method of making the razor blade wiper as well as to the article. The method of making the wiper of the present invention results in substantial saving in the cost of making the wiper in large quantities. As a result of this more economical method of manufacturing the wiper of the present invention the resulting low cost of the wiper of the present invention, the wiper may be distributed even more freely in public places, such as hotels, or Pullman cars, and in addition may be used very inexpensively in the homes.

Just as in the aforementioned patent, the wiper of the present invention may be impregnated with a suitable sterilizing preparation so as to sterilize the blade at the same time that it wipes the blade. While the wiper of the present invention is primarily intended for use in wiping razor blades, it is obvious that it may likewise be used for washing and drying any type of cutlery.

With the foregoing and other objects in view, as will hereinafter become apparent, this invention comprises the constructions, combinations, and arrangements of parts, hereinafter set forth, disclosed and shown on the accompanying drawing.

In this drawing,

Figure 1 is a perspective view of the wiper in operating position,

Figure 2 is a plan view of the wiper in open or flat position, and

Figure 3 is an enlarged sectional view taken on the line 3—3 of Figure 2.

There is shown at 10 a safety razor blade in the act of being wiped by the wiper constituting this invention shown at 11. The wiper 11 consists of a series or plurality of pieces 12 of absorbent paper, and a backing sheet or cover 13. As shown in Figure 3, there are four pieces 12 of absorbent paper, but more or less may be used as desired. The individual pieces 12 of the absorbent paper are very thin as will be seen by comparison with the backing sheet or holder 13, the holder 13 being made preferably of twenty-pound substance paper, that is, paper that is substantially the thickness of ordinary business letter or legal paper.

In making the wiper 11 the sheets 12 are merely placed on the cover or backing sheet 13 and a ridged roller is passed thereover, either by hand, or the assembled pieces 12 of absorbent paper and backing sheet 13 may be fed through an appropriate machine having a pair of suitably spaced rollers, one of which is smooth and against which the backing sheet 13 will contact and the other of which is provided with spaced bridges. The spaced bridges on the roller will make a series of spaced indentations 14 through each of the absorbent pieces 12 and press the upper absorbent sheet into contact with the next upper absorbent sheet and each absorbent sheet into contact with the next lower absorbent sheet pressing the lowermost absorbent sheet into contact with the backing sheet or cover 13 only at the spaced indentation, which if viewed from the backing sheet side will appear as rigid.

No glue or other securing means is necessary in order to cause the absorbent sheet 12 to remain in intimate contact with the backing sheet 13, although if desired, the operation of pressing the sheet 12 into contact with the backing sheet 13 may take place in a humid atmosphere so that the sheet may be very slightly damp, or while the absorbent sheets are still slightly damp after being impregnated with the suitable sterilizing preparation.

Although the wipers 11 may be assembled as individual units, it can likewise be manufactured in a large sheet and then the wipers 11 cut therefrom to suitable size. As will be observed, the indentations 14 are separated by raised portions 15 whose width is substantially greater than the width of the indentations 14.

After the wiper 11 has been cut to a suitable size, it will be folded into booklet form along one of the indentations 14. It will not be folded in half, however, but will be folded so that one leaf 16 of the folds is longer than the other leaf 17 of the folds, along one of the indentations 14 acting as a hinge 18.

As will be observed, the leaf 16 is larger than the leaf 17 by a distance equal to about four of the raised portions 15 and indentations 14, thereby providing an overhanging lip 19. As a result of the presence of this lip 19, it is possible to easily separate the individual wipers 11 for individual use especially when the wiper 11 is used in a wiper dispensing cabinet such as disclosed in the copending application 648,658, filed Dec. 23rd, 1932.

In operation, the individual wiper 11 may be picked up by means of the lip 19 and the shorter leaf 17 allowed to rest against the thumb, thereby opening the wiper 11 in book form, the blade 10 then placed between the leaves 16 and 17 and the moisture on the blade 10 is absorbed by the absorbent paper 12 along the raised portions 15, the indentations 14 serving to gather any excessive moisture and allow the ridges 15 to wipe or dry the blade 10 very thoroughly.

If a sterilizing ingredient is present, the moisture first taken off the blade 10 serves to dissolve it and sterilize the blade, and then it is reabsorbed as the blade passes over the remainder of the surface of the absorbent paper. Obviously, suitable instructions or advertising matter may be placed on the outside of the backing sheet 13 thereby compensating the distributor such as the hotel, for its gratis distribution of the wiper.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

A razor blade wiper comprising a plurality of layers of relatively soft, thin, absorbent papers arranged in superposed relation on a relatively thick backing paper, both said backing paper and superposed layers of absorbent paper being of the same dimensions and of greater length than width, said absorbent papers being crimped or corrugated transversely of the length thereof and from end to end and secured to said backing paper only along said corrugations engaging the same, one of said corrugations defining a fold or hinge line whereby when said backing paper is folded thereon there will be formed a booklet comprising two opposed portions of unequal length, the longer of which is adapted to overlap the shorter in their normal folded relationship when the booklet is closed to present a flap or lip adapted to facilitate the handling of the wiper.

PAUL H. HORWITT.